Oct. 8, 1935.　　　　H. ARNI ET AL　　　　2,016,270
PRINTING DEVICE FOR LENTICULATED FILMS
Filed Sept. 8, 1933
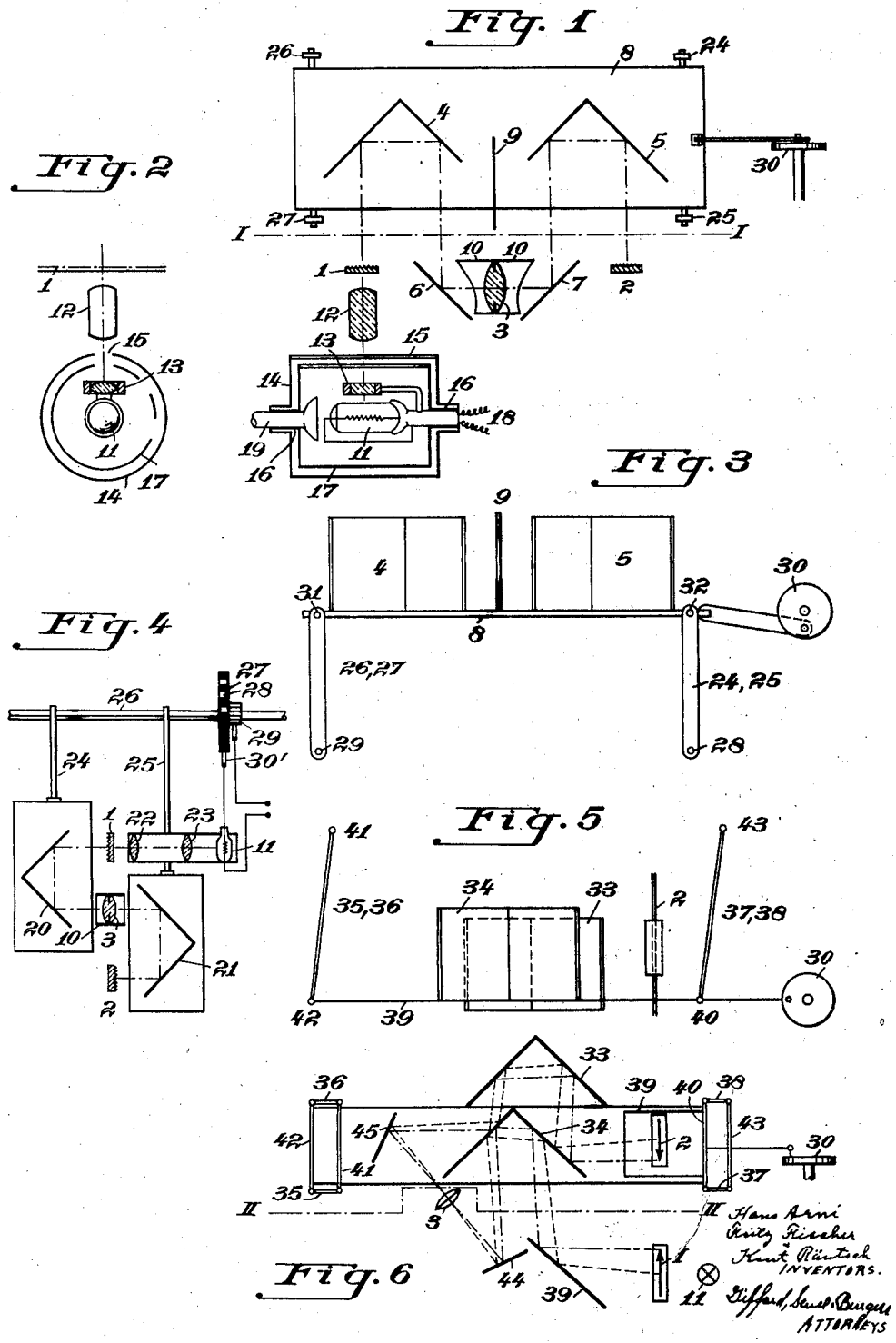

Patented Oct. 8, 1935

2,016,270

UNITED STATES PATENT OFFICE 2,016,270

PRINTING DEVICE FOR LENTICULATED FILMS

Hans Arni, Falkensee, near Berlin, Fritz Fischer, Berlin-Charlottenburg, and Kurt Räntsch, Berlin-Teltow, Germany, assignors to Opticolor Aktiengesellschaft, Glarus, Switzerland, a corporation of Switzerland Application September 8, 1933, Serial No. 688,566 In Germany July 20, 1933

9 Claims. (Cl. 88—24)

This invention relates to printing devices for lenticular films, of the type more broadly claimed in the copending application of Kurt Räntsch, Ser. No. 688,545. More particularly it relates to improvements of such devices, which are characterized by a printing lens of small relative aperture, successively seen from the films in different directions by the help of moving means. The lens has a smaller relative aperture than the lenticular elements, but it is corrected for a greater image than the image on the film.

According to this invention the utmost accuracy in the movement of said movable means is secured so that they are always in the exact position with respect to the fixed means, even when the device is continuously employed for a very long time. Besides, by the invention a drawback is avoided, which else results from the fact that light is reflected at the numerous mirrors not only in the desired but also in a disturbing manner, and that this scattered light, when it reaches the duplicate film, produces a haze, which deteriorates the quality of the duplicates. The haze makes it nearly impossible, for instance, to get pure hues.

To compensate for this difficulty the new machines are constructed in such a manner that the light enters the essential part, between the films, only for so long a time as is necessary at all events. For this purpose the means for interrupting the exposure are arranged at a place, before the light reaches the original film. Either a shutter is arranged between the light source and the original or the light source is only on for short intervals of time.

Further it is advantageous to fix the oscillating means to double-pendula, as the bearings of pendula offer great resistance so that they are not worn even when the machine is continuously employed for a long time. Thus the guaranty of exact working is given. Another advantage of double-pendula is that the oscillating parts may be light, so that the frequency may be high without making the machine vibrate.

Some machines of the new type are drawn in the figures as mere examples of the invention.

The Figures 1, 2 and 3 show a machine, Figure 1 in plan-view, Figure 2 in side-view and Figure 3 in front view.

Figure 4 is the plan-view of another machine.

Figure 5 is a sectional-view and

Figure 6 the plan-view of still another device, the section being indicated by II—II of Figure 6.

Referring first to Figs. 1, 2 and 3, the original film I is lighted by the light-source II. The lenticular elements are turned away from the light source. From the original film the light passes the oscillating optical squares 4 and 5, the fixed arranged mirrors 6 and 7 and the lens system 3. At last it reaches the duplicate film 2.

The optical squares 4 and 5 are fixed to a support 8, which is carried by the arms 24 through 27. These are rotary joined to the support 8 and to the fixed axes 28 and 29, so that the support may oscillate. It is driven by an excenter 30.

The diaphragm 9 is arranged between the mirrors 4 and 5, and the tubes 10 are arranged near the lens system 3, in order to prevent diffuse or scattered light from reaching the duplicate film. The light-source 11 has preferably the oblong shape of a filament. The light is concentrated to the film I by a cylindrical lens 13 and a block 12 of glass or other similar material, which is cut at its front surfaces in the form of lenses with suitable curvature.

The light-source is surrounded by a cylindrical box 14, which is at rest. It has a slit 15 for allowing the light to leave the interior of the box and to reach the film. Within the box 14 a cylindrical shutter 17, rotary around the axis 16, is arranged. The shutter has slits, their number being equal to the number of differently colored zones of the taking or projecting screen. There are, for instance, three slits. The wires 18 for the electrical light-source are drawn through the axis, as well as a tube 19 for a strong blow of air cooling the lamp.

It is preferable to arrange the slits so that their greatest extension is perpendicular to the direction of the lenticular elements on the original film. The slits are then moving parallel to the said elements, which is, in order to prevent dominants, also the case, when any other shape of a shutter instead of the cylinder 17 is employed.

From Figure 3 may be seen, that the optical squares 4 and 5 do not oscillate in straight lines, but are moving on the arcs of cycles. But the mirrors remain always in parallel with themselves as well as their edges do so. Thus a pendulum is, also as regards the optics, as good as a sliding-carriage.

It is important that the double pendulum can be very exactly mounted. The four axes 28, 29, 31 and 32 must form a parallelepiped with the highest degree of accuracy. They must run exactly parallel and have, two by two, equal distances. To enable this, the axes may be adjusted by the help of adjustment-screws very accurately. Each axis is supported by two balls, sliding in conical grooves, which are cut into the front surfaces of the axes. The supports carrying the balls may be adjusted either with respect to the axis or to the frame-work or to the support 8 by the adjustment screws.

Besides, the excenter 30 must not effect any force to the double-pendulum, which could press it unsymmetrically, so that the accuracy of the oscillating movement would be disturbed.

The device of Figure 4 is so constructed that, by the help of the oscillating optical squares 20 and 21, the aperture of the lens 3 is successively seen from the films in different directions. The tube-shaped diaphragms 10 cut off a part of the disturbing scattered light. The film is lighted by the light-source 11 and the condenser lenses 22 and 23. The supports carrying the squares may be constructed as double pendula.

The light-source is only on, when the films are at rest and when the lens aperture is seen from the films in those directions in which the filter-zones are seen in the taking or projecting process. The control of the light-source is performed by the wheel 27 which is attached to the shaft 26. This shaft drives also the optical squares 20 and 21. The wheel is carrying contact pieces 28 on which a spring 30' is sliding. The pieces 28 are connected to a ring 29, which is connected to one terminal of a source of current; the spring 30' is connected to one contact of the light-source 11, the other contact of this light source being connected to the other terminal of the source of current. By suitably arranging the contact pieces it is easy to make the source radiate only in exactly the desired moments. In order to make sure that the source 11 is dark in the intermediate intervals, a source with small heat-capacity is employed, so that it follows immediately the interruptures of the current.

The device represented in the Figures 5 and 6 has a double-pendulum, which is not standing but hanging. The optical means are: Three plane mirrors 39, 44 and 45, unmovably fixed, a lens 3, an optical square 33 which is equally unmovably fixed and two plane surfaces 34 which are reflecting on both sides, so that they are effective as an optical square on one side. This square 34 is arranged on the support 39, which is hanging on the arms 35 through 37, so that it may oscillate. It is driven by the excenter 30.

It is necessary that the axes 40 through 43 are the edges of a very accurate parallelepiped and that they are able to be adjusted. The excenter 30 too must be very accurate and must not actuate any force to the support, which might turn it.

The light is radiated by the source 11 and passes successively the film 1, the mirror 39, the square 34, the mirror 44, the lens system 3, the mirror 45, the squares 33 and 34 and reaches the film 2.

The interrupture of the light may be performed in the same manner as was explained with respect to the other devices.

The described double pendula may be employed with all printing devices for lenticulated films, where moving means are employed in order to effect, that the lens aperture may be seen from the films in different directions.

We claim:

1. In combination, an original film having thereon a multiplicity of lenticulations and a group of color records behind each of said lenticulations, a copy film having similar lenticulations thereon, means for passing light through the original film to the copy film, an optical system disposed in the path of light passing between said films, a support on which portions of said system are mounted, a pendulum connected to said support, and means to rock said pendulum and support to cause movement of said portions of the optical system transversely to the path taken by the light.

2. In combination, an original film having thereon a multiplicity of lenticulations and a group of color records behind each of said lenticulations, a copy film having similar lenticulations thereon, means for passing a light through the original film to the copy film, an optical system disposed in the path of light passing between said films, a support on which portions of said system are mounted, two pendulums connected to said support and spaced apart, and means for rocking said pendulums in unison to cause movement of said portions of the optical system transversely to the path taken by the light.

3. In combination, an original film having thereon a multiplicity of lenticulations and a group of color records behind each of said lenticulations, a copy film having similar lenticulations thereon, means for passing a light through the original film of the copy film, an optical system disposed in the path of light passing between said films, a support on which portions of said system are mounted, two pendulums connected to said support and spaced apart, means for rocking said pendulums in unison to cause movement of said portions of the optical system transversely to the path taken by the light, and means for adjusting the axes of said pendulums.

4. In combination, an original film having thereon a multiplicity of lenticulations and a group of color records behind each of said lenticulations, a copy film having similar lenticulations thereon, means for passing light through the original film to the copy film, an optical system disposed in the path of light passing between said films, a support on which portions of said system are mounted, a pendulum connected to said support, means to rock said pendulum and support to cause movement of said portions of the optical system transversely to the path taken by the light, and means for interrupting passage of said light during movement of said support.

5. In combination, an original film having thereon a multiplicity of lenticulations and a group of color records behind each of said lenticulations, a copy film having similar lenticulations thereon, means for passing light through the original film to the copy film, an optical system disposed in the path of light passing between said films, a support on which portions of said system are mounted, a pendulum connected to said support, means to rock said pendulum and support to cause movement of said portions of the optical system transversely to the path taken by the light, and means for interrupting passage of said light during movement of said support and at a place before the light reaches the original film.

6. In combination, an original film having thereon a multiplicity of lenticulations and a group of color records behind each of said lenticulations, a copy film having similar lenticulations thereon, means for passing light through the original film to the copy film, an optical system disposed in the path of light passing between said films, said system comprising a lens in fixed position, said system also including mirrors mounted on a support, pendulums to which said support is connected, and means for rocking said pendulums with the support thereon.

7. In combination, an original film having thereon a multiplicity of lenticulations and a group of color records behind each of said lenticulations, a copy film having similar lenticulations thereon, means for passing light through the original film to the copy film, an optical system disposed in the path of light passing between said films, said system comprising a lens in fixed position and disposed with its optical axis generally parallel to said films, said system also including mirrors mounted on a support, pendulums to which said support is connected, and means for rocking said pendulums with the support thereon.

8. In combination, an original film having thereon a multiplicity of lenticulations and a group of color records behind each of said lenticulations, a copy film having similar lenticulations thereon, means for passing light through the original film to the copy film, an optical system disposed in the path of light passing between said films, a support on which portions of said system are mounted, two pendulums connected to said support and spaced apart, and a crank having a link connected to said support to rock said support and pendulums.

9. In combination, an original film having thereon a multiplicity of lenticulations and a group of color records behind each of said lenticulations, a copy film having similar lenticulations thereon, means for passing light through the original film to the copy film, an optical system disposed in the path of light passing between said films, a support on which portions of said system are mounted, two pendulums connected to said support and spaced apart, means for rocking said pendulums in unison to cause movement of said portions of the optical system transversely to the path taken by the light, a lamp providing said light, a diaphragm surrounding said light and having a slit therein through which light may pass to said optical system, and a shutter likewise surrounding said light and movable around it, said shutter having slits therein corresponding in number to the number of color records in each of said groups.

HANS ARNI.
FRITZ FISCHER.
KURT RÄNTSCH.